(No Model.) 4 Sheets—Sheet 1.

O. PATIN & L. LEVAVASSEUR.
DYNAMO ELECTRIC MACHINE OR ELECTRIC MOTOR.

No. 560,006. Patented May 12, 1896.

Witnesses:
W. K. Boulter

Inventors:
Octave Patin
Léon Levavasseur
By Wm. E. Boulter,
Attorney (No Model.) 4 Sheets—Sheet 2.
O. PATIN & L. LEVAVASSEUR.
DYNAMO ELECTRIC MACHINE OR ELECTRIC MOTOR.
No. 560,006. Patented May 12, 1896.
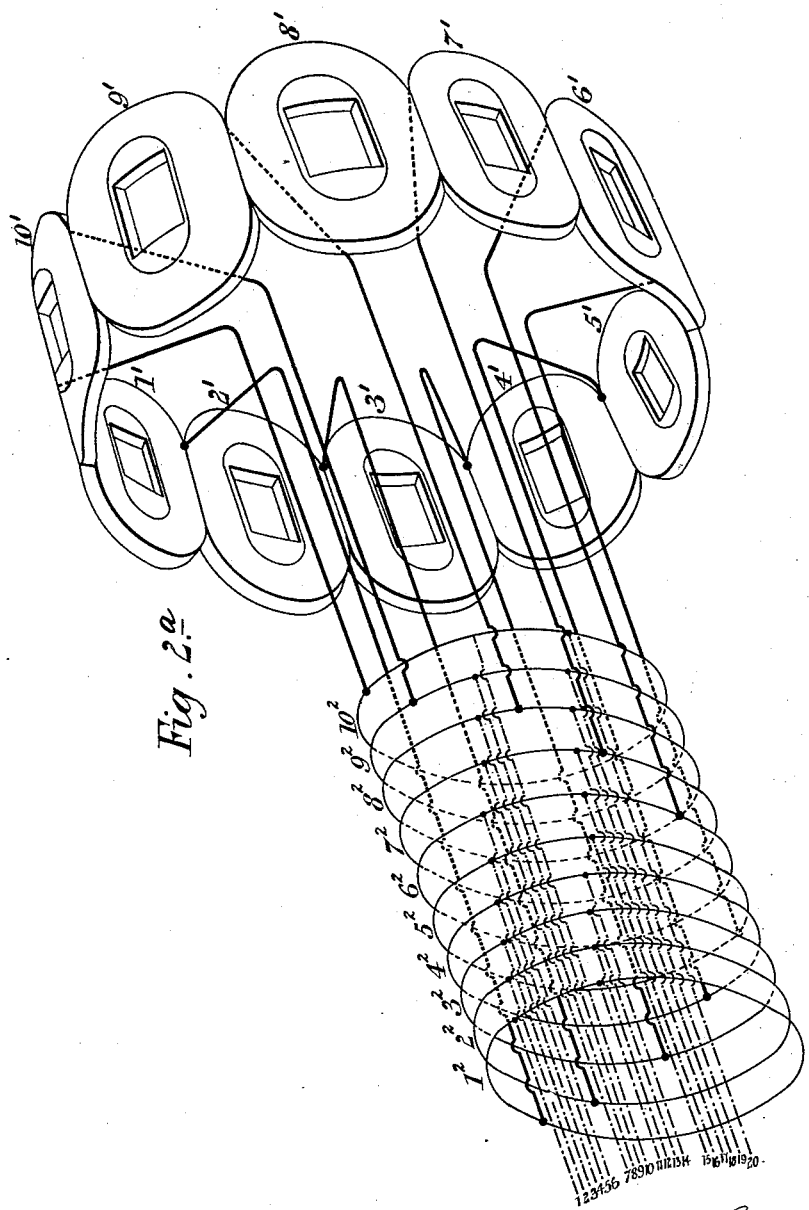

(No Model.) 4 Sheets—Sheet 4.
O. PATIN & L. LEVAVASSEUR.
DYNAMO ELECTRIC MACHINE OR ELECTRIC MOTOR.
No. 560,006. Patented May 12, 1896.
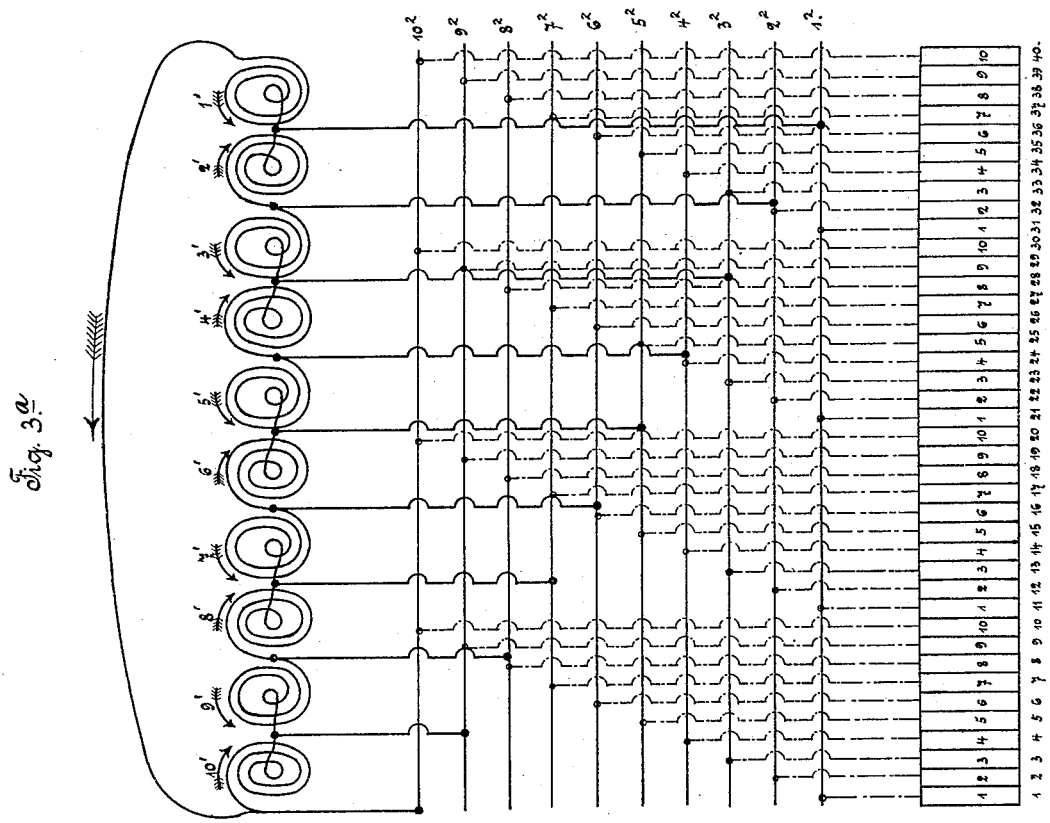

UNITED STATES PATENT OFFICE.

OCTAVE PATIN AND LÉON LEVAVASSEUR, OF PARIS, FRANCE.

DYNAMO-ELECTRIC MACHINE OR ELECTRIC MOTOR.

SPECIFICATION forming part of Letters Patent No. 560,006, dated May 12, 1896.

Application filed June 19, 1893. Serial No. 478,169. (No model.)

*To all whom it may concern:*

Be it known that we, OCTAVE PATIN and LÉON LEVAVASSEUR, citizens of the Republic of France, residing at Paris, France, have invented certain new and useful Improvements in or Relating to Dynamos or Electric Motors, of which the following is a specification.

This invention relates to improvements in electric dynamos or motors to be used either for generating continuous currents or when used as a motor working with a continuous or an alternating current.

Figure 1:
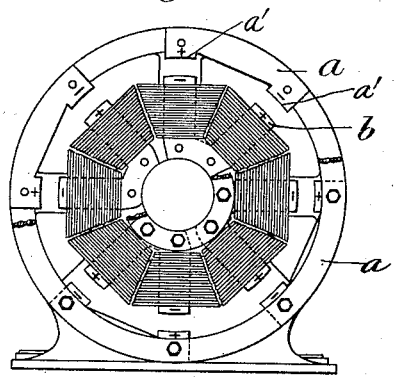
Figure 2:
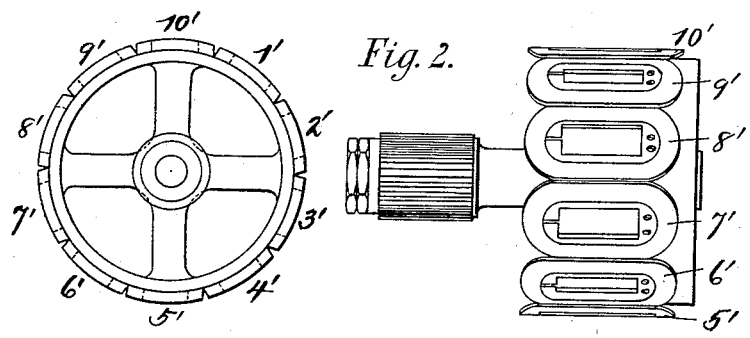
Figure 4:
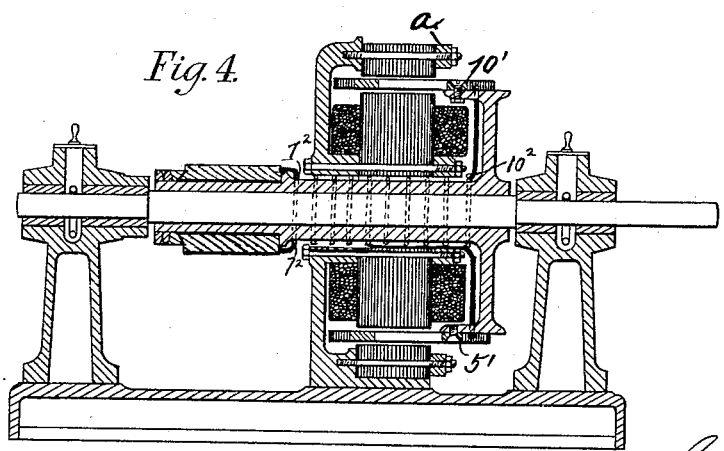
Figure 3:
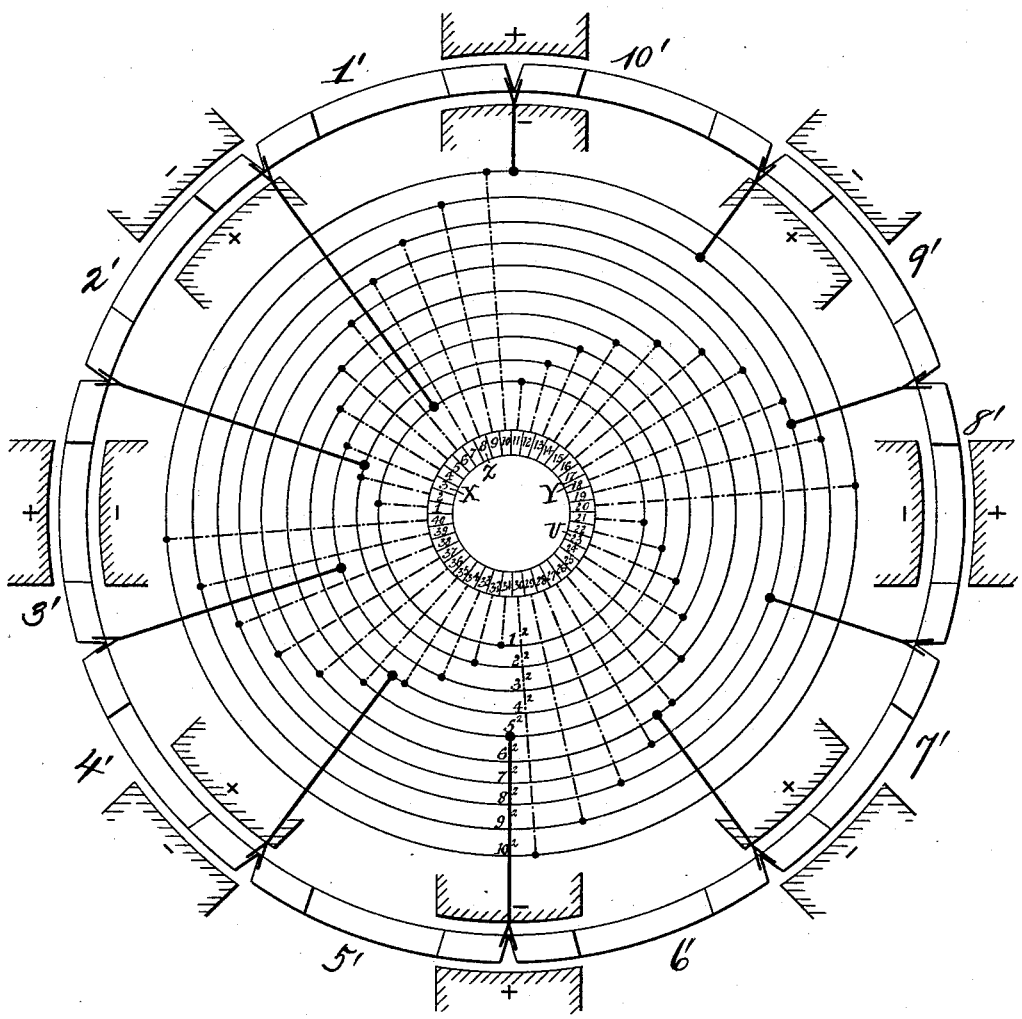

Figure 1 is an elevation of our dynamo. Fig. 2 is a detail front and side elevation of the movable armature. Fig. $2^a$ is a perspective view showing, diagrammatically, the connections between the movable armature, rings, and commutator. Fig. 3 is a diagrammatic view of the commutator. Fig. $3^a$ is a diagrammatic plan view showing the connections between the armature, rings, and commutator. Fig. 4 is a vertical sectional view of the dynamo.

The essential parts of this machine are, first, a fixed inductor or magnet having eight poles alternately + (positive) and −, (negative,) as indicated in Fig. 1; second, a movable armature, Fig. 2, consisting of ten flat coils adapted to revolve in the interior of the inductor or fixed magnet; third, a commutator provided with conductors for connecting the commutator with the armature-coils. (Shown in Fig. 3.)

The inductor or fixed magnet is preferably composed of a number of U-shaped wrought-iron plates $b$, held between two cast-iron plates. When mounted together, the inductor has somewhat the appearance of a toothed wheel. On the eight teeth of this wheel are mounted the coils of copper wire, which latter are connected together in such a manner that when a current passes through them the magnetic wheel presents alternately (+) positive and (−) negative poles. The exterior is provided with a concentric rim or crown, which may be composed of a number of sheet or cast iron plates $a$, provided with projections $a'$ at the poles. This rim is for the purpose of closing the magnetic circuit, so as to intensify the current between the poles. The armature consists of ten coils, numbered from 1′ to 10′. The coils form a closed and continuous circuit, so that if the circuit be broken at any point and a current passed through, the coils form solenoids with the poles alternately positive and negative. Attached to the junctions of the coils are ten separate wires which form connections with ten separate and insulated rings (numbered from $1^2$ to $10^2$) arranged side by side around a sleeve of the armature. The commutator may be composed of, say, forty segments enumerated in Fig. 3 of the accompanying drawings, 1 2 3 4 5 6 7 8 to 40. The segments 1 11 21 31 are in communication with ring No. $1^2$. The segments 2 12 22 32 are in communication with ring No. $2^2$, and so on throughout the series, so as to bring the segments 10 20 30 40 into communication with the ring No. $10^2$.

The machine hereinbefore described is composed of eight poles and ten coils; but a greater number of poles and coils may be employed provided that the same proportion prevails. If the machine is used for generating a continuous current, the commutator may be provided with eight brushes separated by intervals of, say, five segments, but electrically connected in pairs. Any other combination can, however, be employed so long as each two pairs of brushes receive the same currents at intervals of, say, ten or any multiple of ten segments. If the machine has only two brushes, the latter can be placed on the commutator to leave an interval of either five, fifteen, twenty-five, or thirty-five segments. In order to make this clear, it is supposed to provide an interval of fifteen segments. If the machine is used as a generator, the brushes should be placed in such a position as to cover the segments X and Y. If the machine is worked as a motor with a continuous or alternating current, the brushes should be placed so as to cover the segments Z U.

We claim—

1. In a dynamo, the combination of a fixed magnet, the coils thereof connected as described, the revoluble armature comprising coils and a metallic disk arranged as described, the insulated rings arranged side by side around a sleeve of the armature, connections between the armature-coils and said rings, and the segmental commutator and connections between the latter and the rings, all as specified.

2. In a dynamo the combination of the fixed magnet the same being composed of a series of U-shaped wrought-iron plates and cast-iron plates confining said wrought-iron plates, the wire coils mounted upon said magnet as described, the concentric rim composed of a series of plates having projections at the poles, the revoluble armature composed of the wire coils and a metallic disk, the rings, the wires joining the latter with the armature-coils, the commutator composed of segments and wires joining the latter with the said rings, all arranged for coöperation as specified.

In testimony whereof we have hereto set our hands in the presence of the two subscribing witnesses.

OCTAVE PATIN.
          LÉON LEVAVASSEUR.

Witnesses:
    CH. DE MOSENTHAL,
    ROBT. M. HOOPER.